(12) United States Patent    (10) Patent No.: US 6,186,401 B1
Magana    (45) Date of Patent: *Feb. 13, 2001

(54) TRANSACTION CARD GATE MECHANISM

(75) Inventor: Leroy Esteban Magana, Fontana, CA (US)

(73) Assignee: ITT Manufacturing Enterprises, Inc., Wilmington, DE (US)

( * ) Notice: Under 35 U.S.C. 154(b), the term of this patent shall be extended for 0 days.

This patent is subject to a terminal disclaimer.

(21) Appl. No.: 09/251,197

(22) Filed: Feb. 16, 1999

Related U.S. Application Data

(63) Continuation-in-part of application No. 08/976,947, filed on Nov. 24, 1997, now Pat. No. 5,957,170.

(51) Int. Cl.[7] .................................................. G06K 13/00
(52) U.S. Cl. .......................................... 235/475; 235/482
(58) Field of Search .................................... 235/475, 444, 235/451, 482, 483, 486, 485, 449

(56) References Cited

U.S. PATENT DOCUMENTS

| | | | |
|---|---|---|---|
| 3,766,687 | * 10/1973 | Henson | 235/61.11 R |
| 3,850,299 | * 11/1974 | Kreitzer | 235/61.7 |
| 4,833,310 | * 5/1989 | Shimamura et al. | 235/492 |
| 5,017,764 | * 5/1991 | Hashimoto | 235/454 |
| 5,045,674 | * 9/1991 | Mita et al. | 235/475 |
| 5,061,842 | * 10/1991 | Payne | 235/449 |
| 5,146,069 | * 9/1992 | Orimoto et al. | 235/475 |
| 5,150,352 | * 9/1992 | Kurihara | 235/475 |
| 5,179,504 | * 1/1993 | Kitahara | 235/475 |
| 5,264,686 | * 11/1993 | Kitahara | 235/475 |
| 5,331,138 | * 7/1994 | Saroya | 235/492 |
| 5,360,969 | * 11/1994 | Suzuki | 235/479 |
| 5,466,914 | * 11/1995 | Kitahara | 235/483 |
| 5,484,989 | * 1/1996 | Kumar et al. | 235/475 |
| 5,505,289 | * 4/1996 | Watabe et al. | 194/206 |
| 5,532,466 | * 7/1996 | Konno et al. | 235/472 |
| 5,557,089 | * 9/1996 | Hall et al. | 235/440 |
| 5,640,307 | * 6/1997 | Bleier et al. | 235/475 |

* cited by examiner

Primary Examiner—Karl D. Frech
Assistant Examiner—Diane I. Lee
(74) Attorney, Agent, or Firm—Roger Turner

(57) ABSTRACT

Apparatus of simple construction that can pass the front portion of a smart card to a card reader, while safeguarding the card reader from vandalism. A gate device (32) whose front end (52) can be pivoted up by the leading edge of the card, is initially prevented from pivoting up by a pair of release members (34, 36) lying within laterally opposite sides of the card path (24). The opposite corners (J, K) of the card leading edge push the release members laterally (L) out of the card path and causes the release members to release the card gate to pivot up.

14 Claims, 4 Drawing Sheets

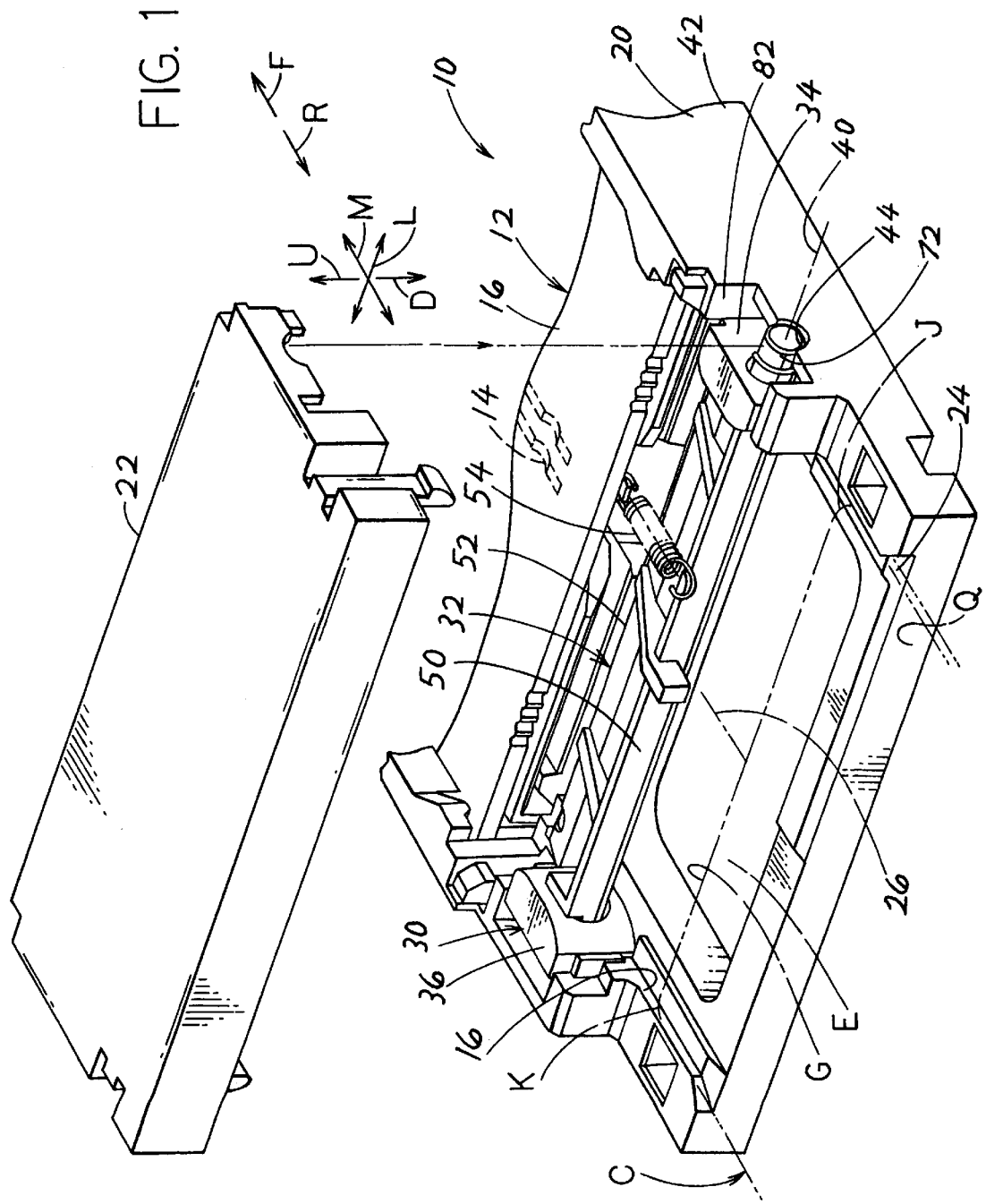

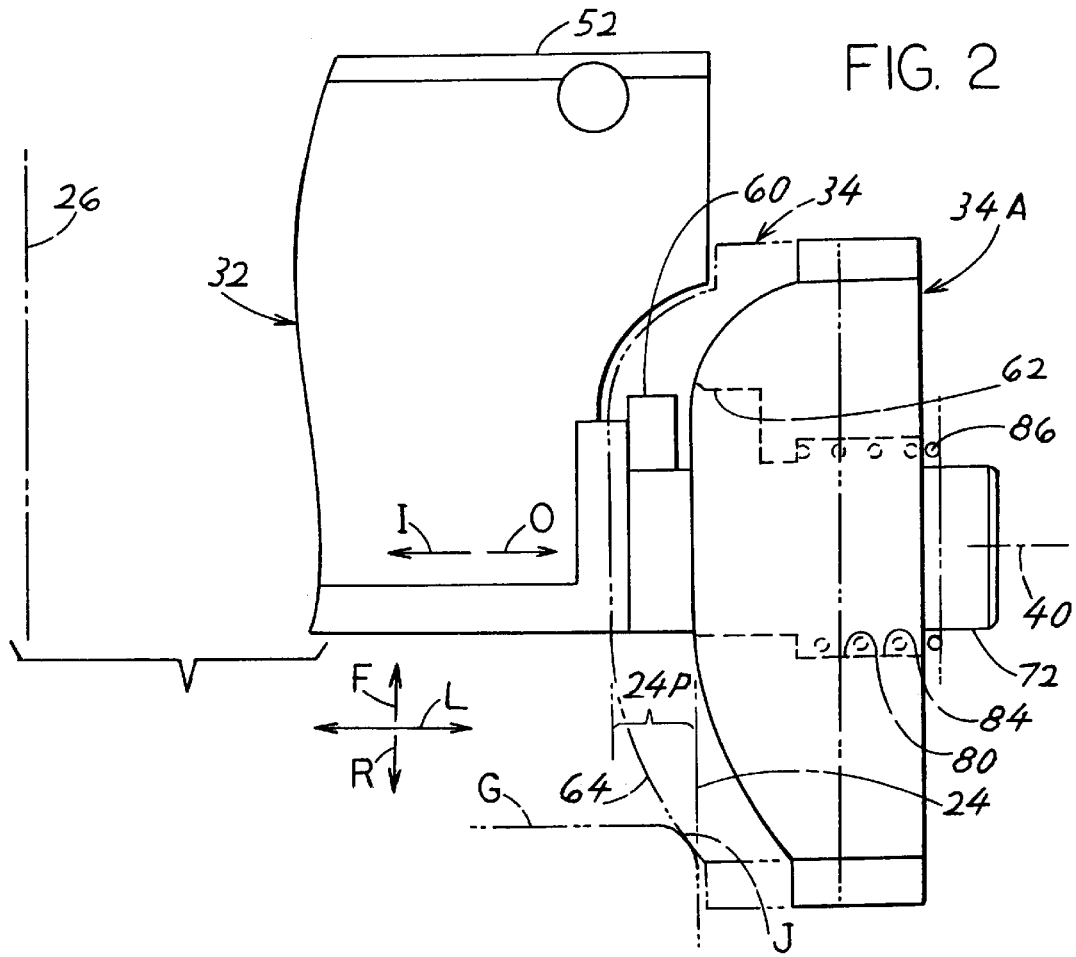
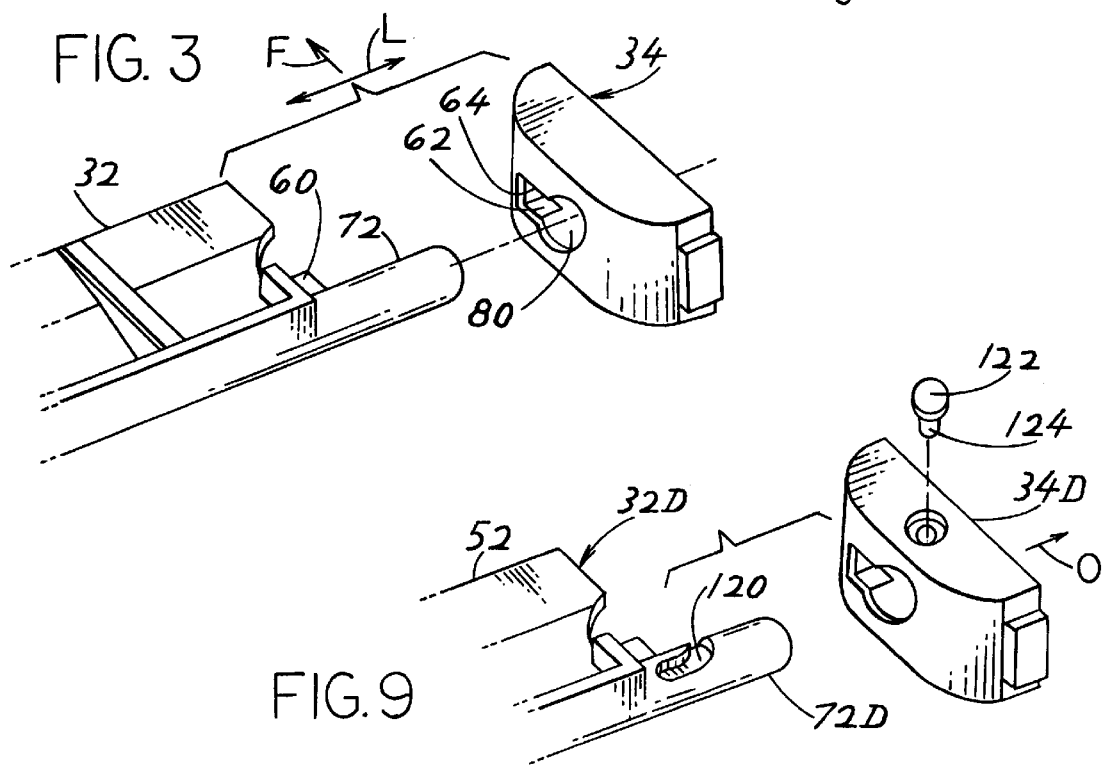

TRANSACTION CARD GATE MECHANISM

CROSS REFERENCE

This is a continuation-in-part of U.S. patent application Ser. No. 08/976,947 filed Nov. 24, 1997 now U.S. Pat. No. 5,957,170.

BACKGROUND OF THE INVENTION

Card reader assemblies that receive data-storing cards such as chip cards, or smart cards, are sometimes placed in unattended public places, such as in pay telephones and money vending machines. Vandals may insert thin objects such as knives or keys to see if they are able to "fool" the card reader assembly. It would be desirable if the card reader assemblies could block the deep insertion of foreign objects so they are prevented from reaching the card reader and damaging its pad-engaging contacts or other reading elements.

SUMMARY OF THE INVENTION

In accordance with one embodiment of the present invention, a simple and low cost apparatus is provided for resisting the passage of vandalizing instruments that are inserted along a card path of a card reader assembly, so the instruments do not reach card reader contacts to damage them, while allowing the passage of a proper sized card into the card reader. The apparatus includes a card gate mechanism with a card gate that is normally in a closed position to block the card path and prevent the passage of vandalizing instruments. A release member at one lateral side of the card path, and preferably a pair of release members at laterally opposite sides of the card path, are biased to lie within the card path, but can be deflected at least partially laterally out of the card path by the opposite corners of the card leading edge. The release members initially block movement of the card gate to its open position, but release the card gate to move to its open position when the release members are deflected out of the card path.

The card gate includes a pair of trunions at its laterally opposite sides which are pivotally mounted on the housing of the card reader assembly. The release members have holes through which the trunions extend, with the release members confined to sliding laterally out of and back into the side of the card path.

The card gate is molded of a high strength plastic. Pads of softer and lower friction material such as a fluorocarbon are mounted to project from the lower face of the card gate so the pads ride along the card to minimize scratching of the card. A shoulder part of the card gate which is blocked by the release members until the release members are deflected, is connected through a weakened area such as a groove, to the rest of the card gate, so the shoulder part can break off from the rest of the card gate when a vandal presses an instrument with high force along the card path. Until the broken card gate is replaced, it does not block the entrance of vandalizing instruments along the card path, but it still allows proper cards to be inserted to the card reader for readout.

The novel features of the invention are set forth with particularity in the appended claims. The invention will be best understood from the following description when read in conjunction with the accompanying drawings.

BRIEF DESCRIPTION OF THE DRAWINGS

FIG. 1 is an exploded isometric view of a portion of a card reader assembly of the present invention, with part of a partially inserted card shown in phantom lines.

FIG. 2 is an enlarged plan view of a portion of the card reader assembly of FIG. 1, showing a release member in a release position, and also showing, in phantom lines, the release member in its initial blocking position.

FIG. 3 is an exploded isometric view of the parts of FIG. 2.

FIG. 9 is an exploded partial isometric view of a gate mechanism which is modified from that of FIG. 3.

DESCRIPTION OF THE PREFERRED EMBODIMENTS

Figure 4:
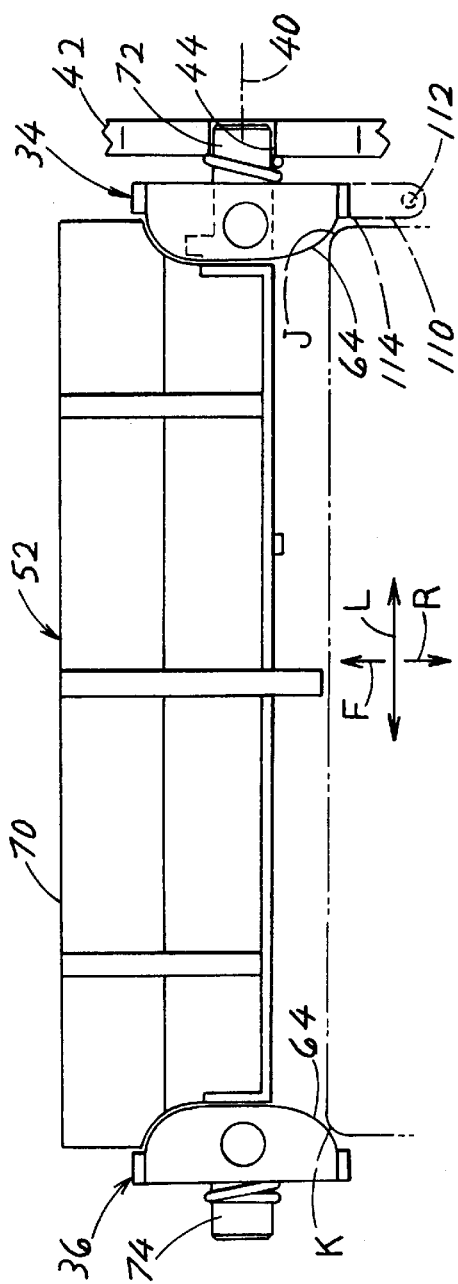
FIG. 4 is a plan view of the card gate and release members of the card reader assembly of FIG. 1, showing, in phantom lines, the leading edge of a card as it first encounters the release members but before moving them.

FIG. 1 shows a card receiving assembly or apparatus 10 for receiving a smart card C which has a front portion E with a leading edge G that includes laterally (L) opposite corners J, K. One standard (according to American National Standards Institute) smart card has a width in the lateral direction L of 85.6 mm and a thickness or height in vertical directions U, D of about 0.84 mm. The apparatus includes a card reader 12 having a circuit board 16 and a group of contacts 14 for engaging contact pads on the upper face 0 of the card to provide access to an embedded IC memory chip in the card. The memory is read out and/or read in by inserting the card in the forward F longitudinal direction M through housing wall guides forming a card slot 16 whose front end is formed between a lower main part 20 of the apparatus and an upper part or cover 22. When the card is inserted, its leading edge moves along a card path 24 that has a horizontal longitudinally-extending axis 26 that leads to the card reader 12.

When the apparatus 10 is used in an unattended public location, it is possible for vandals to insert knives, keys, coins, etc. through the card slot 16 in an attempt to find a way to operate the card reader without an authorized card. If such instruments should reach the contacts 14 of the card reader, the instruments may damage the contacts. Also, small instruments such as coins, toothpicks, or gum wrappers inserted through the slot 16 could block the slot and prevent a standard card from being fully inserted to the card reader.

In accordance with the present invention, applicant provides a card gate mechanism 30 that blocks the deep insertion of an instrument to the card reader along the card path 24, while allowing standard cards to be inserted therealong. The gate mechanism includes a gate device or gate 32 that normally blocks the card path, and a pair of release members 34, 36 that prevent opening of the gate unless the inserted object is similar to a standard card.

The gate 32 is pivotally mounted about a lateral horizontal axis 40. The card reader assembly or apparatus includes a housing 42 with bearing parts 44 that support the gate in pivoting about its lateral axis 40. The gate has a rear end 50 that is pivotally mounted about the axis 40, and has a front end 52 that extends across substantially the entire width of the card path to block it, until the gate is pivoted so its front end 52 is lifted by the forward insertion of the leading edge G of the card. A spring 54 urges the gate to pivot to a position where the gate is closed, although only a small forward force on the card can overcome the spring to pivot the gate up and allow the card to pass forward to the card reader. The release members 34, 36 initially prevent the gate from pivoting up.

As shown in FIG. 2, each release member such as 34 is moveable in a lateral direction L between an initial blocking position 34 and a release position 34A. The gate 32 has a shoulder part 60 while the release member has a slot 62 that receives the shoulder part 60 when the release member is in its initial blocking position 34. In the initial blocking position, walls of the slot 62 prevent the shoulder part 60 from pivoting up about the lateral axis 40, which prevents the gate 32 from pivoting to raise its front end 52. When the card leading edge G is moved forward, one of its corners J presses against a card-engaging part or surface 64 of the release member. The card-engaging surface extends at an incline to the longitudinal axis 26 of the card path, to extend forwardly and towards the axis. As a result, a forward force by the corner J against the surface 64 presses the surface in an outward O lateral direction L away from the axis, to move the release member to the release position 34. The release member then has moved out of a side portion 24P of the card path. In the release position, the shoulder part 60 of the gate no longer lies in the slot 62, so the gate is free to pivot about the lateral axis 40. FIG. 3 (and 5 and 6) shows the shape of the shoulder part 60 and the walls of the slot 62 in the release member 34, showing that a release wall 64 of the slot 62 prevents upward movement of the shoulder part 60 of the gate 32 in the initial position.

As shown in FIG. 4, the card gate 34 has a main part 70 and a pair of short shafts or trunions 72, 74 at the laterally opposite sides of the gate part, with the trunions lying along the lateral axis 40 about which the gate pivots. As mentioned earlier, the gate device pivots on the trunions 72 about corresponding bearing parts 44 of the housing 42. In addition, the trunions help to guide the release members 34, 36 in lateral movement away from and towards each other. FIG. 4 shows the opposite corners J, K of the card leading edge pressing against the camming surfaces 64 of the release members, so further forward movement of the card will cause the release members to move apart. As shown in FIG. 3, the release members have through holes 80 through which the trunnions 72 project, with ends of the trunions projecting beyond the release members and being pivotally mounted on the housing. The engagement of the trunions 72 with walls of the through hole 80 help to guide the release member 34 in lateral movement.

It should be noted from FIG. 1, that walls of the housing such as 82 prevent pivoting of the release members about any axis and especially about the lateral axis 40, while allowing the release members to slide laterally. The trunnions such as 72 more accurately guide the release members and hold them in place. By projecting the trunions through the release member holes 80, applicant reduces the space occupied by the release members while accurately confining the release members to sliding along the axis 40. FIG. 2 shows that the hole 80 in the release member has an enlarged outer end 84 which receives a spring 86. The spring 86 has its outer end lying against the housing, and its inner end pressing the release member inwardly, in direction I, towards the axis 26 of the card path. It would be possible to replace the trunnions with short shafts fixed to a housing and projecting into holes in the gate, but this would not be as simple a design.

Figure 7:
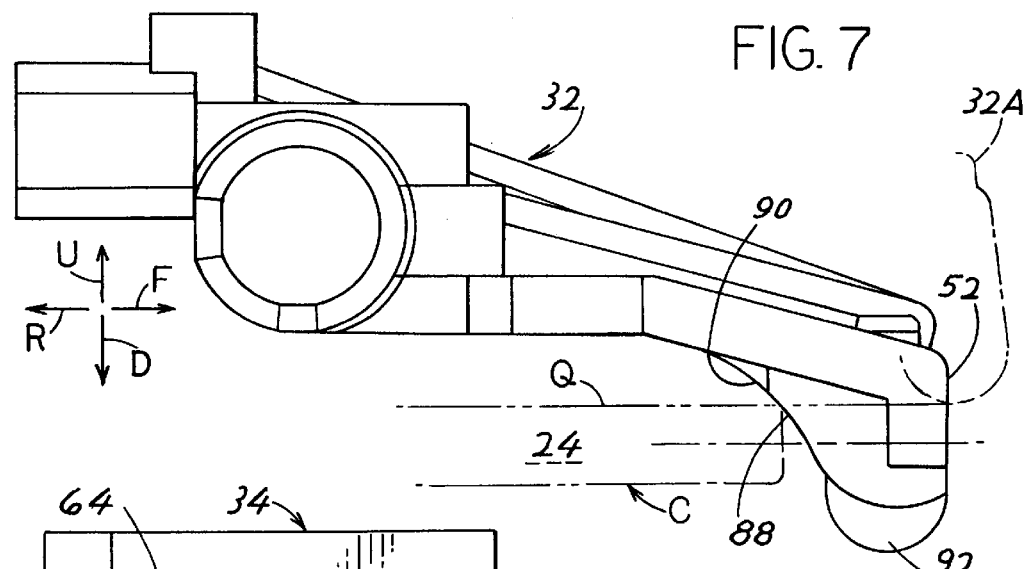
FIG. 7 is a side elevation view of the gate device of FIG. 5.
Figure 6:
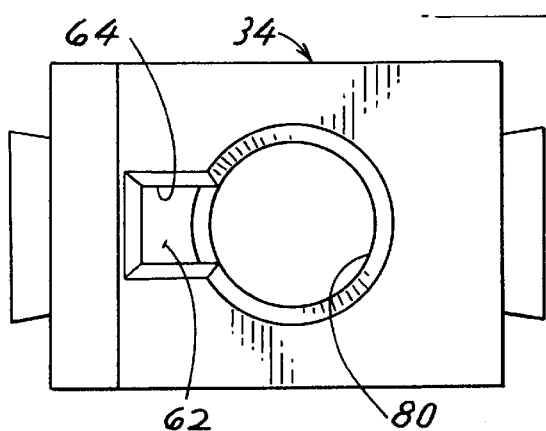
FIG. 6 is a side elevation view of a release member of the mechanism of FIG. 4.
Figure 8:
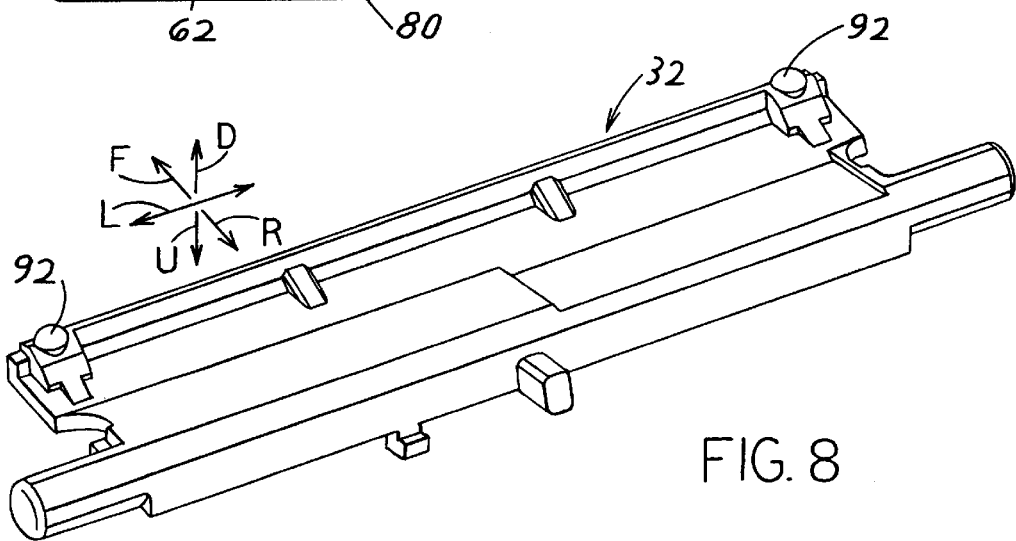
FIG. 8 is an upside-down isometric view of the gate device of FIG. 7.

FIG. 7 shows a card C moving forward along the card path 24 and pressing against card-blocking part 88 on a lower surface 90 of the card gate 32. Additional forward movement of the card raises the card gate to the position 32A (if the release devices have been deflected apart). Applicant provides pads 92 at the bottom of the gate front end 52 that ride directly on the upper face Q of the card. As shown in FIG. 8, the pads 92 lie near laterally opposite sides of the card path, so any scratching of the card will occur near its lateral edges, where the scratching is least likely to damage decorations on the card. Many cards have embossed decorations, that would be readily scratched by a gate mechanism. To further minimize scratching, applicant constructs the pads 92 of material having a low coefficient of friction and low hardness, such as a fluorocarbon, e.g. TEFLON. The rest of the gate device can be molded of a higher strength material, which has a higher coefficient of friction against the plastic of a card and/or a greater hardness. The plastic of most of the gate device, which has a greater coefficient of friction in sliding against a plastic card and/or has a greater hardness so it is more likely to scratch a card surface, has a greater strength and/or is easier and cheaper to mold.

Figure 5:
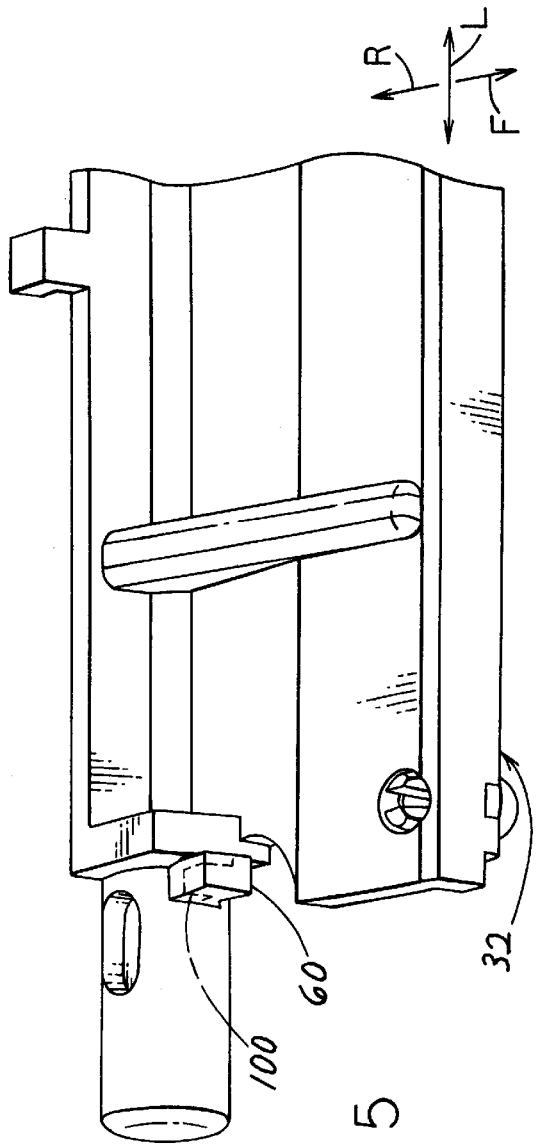
FIG. 5 is an isometric view of an end portion of the card gate of FIG. 4.

Although the card gate mechanism 30 resists the passage of items other than a standard size card along the card path to the card reader, the mechanism can be constructed to allow a vandal who applies a large force, to produce minimum damage to the card reader assembly. FIG. 5 shows, in phantom lines, a weakening means 100 in the form of a slot that weakens the physical connection of the shoulder part 60 to the rest of the gate device 32. The weakening means is constructed so when a predetermined forward or upward force is applied to the gate rear end, the shoulder parts 60 break away from the rest of the gate. This allows the gate to be easily lifted. If the vandal has not damaged the contacts 14 (FIG. 1) that engage card contact pads that have reached the card reader, then the card reader assembly can continue to function. That is, standard cards can continue to be inserted forwardly along the card path to the card reader for reading of the cards. Then, foreign objects can be inserted along the card path with only the slight resistance of the spring 54, until the broken gate is replaced. While tests may show that without the weakening slots the gate breaks when a forward force of about 8 pounds is applied, the weakening slots may allow breakoff of the shoulder parts when a forward force of 4 pounds is applied to the gate.

Although applicant prefers simple lateral sliding movement of the release members, FIG. 4 shows a pivoting lever 110 in phantom lines, which pivots about a vertical axis 112 and which is part of a modified release member 114. The release member 114 moves primarily laterally by pivoting about the axis 112. This arrangement is not preferred because it involves an additional pivot connection at 112, but it can be used. In both cases, the release member 34 or 114 moves largely in a lateral direction between its release position and its initial or blocking position.

FIG. 9 illustrates another embodiment of the invention, where the trunnion 72D has a largely helical track 120 formed by a groove in the trunnions. The release member 34D has a pin 122 with a cam follower 124 that is engaged with the helical track 120 as by projecting into the groove formed by the track. When the release member 34D moves in an outward O lateral direction, the follower 124 urges the gate 32D to pivot in a direction to raise its front end 52.

While terms such as "upper", "lower", "horizontal", etc. have been used to help describe the invention as illustrated, it should be understood that it is possible for the card gate assembly or apparatus to be used in any orientation with respect to the Earth.

Thus, the invention provides an apparatus for use with a card of predetermined lateral width, which includes a gate mechanism that prevents the passage of an object along the card path to the card reader, unless the object is of about the same shape as a standard card. The gate mechanism includes a gate which initially lies in a closed position to block the card path, and also includes one and preferably a pair of release members which prevent movement of the gate to its open position until the release members are moved out of side portions of the card path. A pair of release members are preferably slidably mounted to be forcefully slid apart against biasing forces by corners of the card-leading edge, with the release members then moving out of the path of shoulder parts on the card gate to allow the card gate rear end to pivot out of the way of the card. The card gate is pivotally mounted and has a pair of short shafts or trunions at its opposite ends, with the release members having holes that receive the trunions in sliding movement along the trunions. The shoulder parts can be connected by a controlled weakened joint to the rest of the gate, to allow the shoulder parts to break away (or parts of the release members to break away) when a large force is applied to the gate.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. Apparatus for use with a card of predetermined lateral width, where the card has a card front portion with a leading edge, comprising:

a card reader;

a housing that forms guides that can guide the card front portion in movement forwardly along a card path that has a longitudinal axis, to said card reader;

a gate mechanism including a gate which initially lies in a closed position wherein it blocks substantially the entire card path as viewed along said axis, to prevent the insertion of items along said card path;

said gate is moveable from said closed position wherein said gate blocks the forward passage of an object along said card path to an open position wherein it allows passage of the card front portion forward of the gate, and said gate mechanism includes a pair of release members with card-engaging parts lying at laterally spaced locations within said card path and coupled to said gate to initially block movement of said gate but to allow movement of said gate toward said open position when said card-engaging parts are pushed apart to move at least partially in said lateral directions.

2. The apparatus described in claim 1 wherein:

said card front portion leading edge has laterally opposite corners;

said release members are each mounted to slide in said lateral directions with respect to said housing without pivoting, and said card-engaging parts have surfaces inclined fowardly and toward said axis to be urged away from said axis by said corners of a forwardly-moving card leading edge.

3. The apparatus described in claim 1 wherein:

said gate has a main part and a pair of shoulder parts, and said release members each has a gate-engaging part that lies in the path of one of said shoulder parts to prevent movement of said gate device from said closed portion toward said open position;

said gate has weakening means between said gate main part and each of shoulder parts, for enabling breaking at said weakening means to allow said gate main part to be moved toward said open position when a large force is applied to said gate main part.

4. The apparatus described in claim 1 wherein:

said gate mechanism includes a pair of short shafts at laterally opposite ends of said gate which support said gate device in pivoting about a lateral axis on said housing;

said release members have holes that receive said shafts with said release members being confined to sliding along said shafts.

5. The apparatus described in claim 1 wherein:

said gate is pivotable about a laterally-extending axis;

said gate mechanism includes a short shaft lying at at least one lateral end of said gate device and extending along said laterally-extending axis, with said short shaft forming a largely helical track;

at least one of said release members is prevented from pivoting about a lateral axis and has a follower that engages said largely helical track, so when said at least one of said release members moves laterally as said release members are pushed apart, said follower pivots said gate.

6. The apparatus described in claim 1 wherein:

said gate has a main part with a rear end that is pivotally mounted about a lateral axis on said housing, and said gate main part has a front end with a lower face that lies in the way of a card moving forward along said card path;

said gate main part is molded of a first material, and including at least one pad of a second material that has a lower coefficient of friction than said first material, with said pad lying below the lower surface of said gate main part front end so said pad rests on an inserted card as it slides along said path.

7. The apparatus described in claim 1 wherein:

said gate has a main part with a rear end that is pivotally mounted about a lateral axis on said housing, and said gate main part has a front end with a lower face that lies in the way of a card moving forward along said card path;

said gate main part is molded of a first material, and including at least one pad of a second material that has a lower hardness than said first material, with said pad lying below the lower surface of said gate main part front end so said pad rests on an inserted card as it slides along said path.

8. Apparatus for use with a card of predetermined width, that has a card front portion with a leading edge that has opposite corners, comprising:

a housing that forms a card slot with walls for guiding said card along a card path that has a longitudinal axis and laterally opposite sides;

a gate which is moveably mounted on said housing, with said gate having a card-blocking part that initially lies along said card path and that can be pushed largely forward by said card front portion to move said card-blocking part to an unblocking position out of said card path;

at least one release member biased toward an initial position wherein a card engaging part of said release member lies laterally within one of said sides of said card path to be engaged by one of said opposite corners of said card leading edge, with said release member being moveable at least partially in a lateral direction to a release position wherein its card-engaging part lies laterally outside the corresponding side of said card path;

said release member has a release part that stops said gate device from moving its card-blocking part from said initial position to said unblocking position, in said initial position of said release member, and said release member is constructed to release said gate to move to said unblocking position when said release member moves to said release position.

9. The apparatus described in claim 8 including:

means for guiding said release member in sliding in said lateral direction without pivoting, and spring means urging said release member toward a position in said card path side.

10. The apparatus described in claim 9 wherein:

said gate is pivotable about a lateral axis, and said gate has a pair of trunnions at laterally opposite sides of said gate;

said release member has a hole that receives one of said trunnions to help guide said release member in sliding lateral movement.

11. The apparatus described in claim 8 wherein:

said at least one release member includes a pair of release members biased to each lie within said opposite sides of said card path and with said pair of release members being moveable apart.

12. A method for inserting a card that has a laterally-extending leading edge with laterally opposite corners into a card reader that includes a gate that normally locks full insertion of the card into the card reader, comprising:

inserting and moving said card leading edge forwardly through a card slot and along a card path, past a pair of release members that lie within laterally opposite sides of said card path and that prevents opening of said gate, while deflecting said release members at least partially in lateral directions away from each other and out of said card path sides and out of engagement with said gate that extends in line with said card path to release said gate to move from a position in said card path to a position out of said card path.

13. The method described in claim 12 wherein:

said gate is pivotally mounted about a lateral axis, and said gate has laterally opposite sides and has a pair of trunnions at said laterally opposite sides with said trunnions each extending along said lateral axis;

said step of deflecting said release members includes sliding said release members apart along said trunnions.

14. The method described in claim 12 including:

allowing parts of said gate that are initially held by said release members, to break free of a main part of said gate, to allow said main part of said gate to be moved to said position that is out of said card path, when a large force above a predetermined level is applied to said gate by an object moving along said card path that does not move both of said release members apart.

* * * * *